United States Patent [19]

Korwin et al.

[11] 4,230,914
[45] * Oct. 28, 1980

[54] SYSTEM FOR AND METHOD OF INDICATING INTRUDER PRESENCE ON TELEPHONE LINES, AND METHOD OF INSTALLATION OF TELEPHONE INTRUDER ALARM SYSTEM

[75] Inventors: Paul Korwin, Flushing, N.Y.; Eric S. Cohen, South Orange, N.J.

[73] Assignee: Cose Technology Corporation, New York, N.Y.

[*] Notice: The portion of the term of this patent subsequent to Jan. 23, 1996, has been disclaimed.

[21] Appl. No.: 964,947

[22] Filed: Nov. 30, 1978

[51] Int. Cl.$^3$ .............................................. H04M 1/68
[52] U.S. Cl. .................................. 179/81 E; 179/81 C
[58] Field of Search ................. 179/81 R, 81 C, 81 E, 179/1 MN

[56] References Cited

U.S. PATENT DOCUMENTS

| | | | |
|---|---|---|---|
| 1,991,383 | 2/1935 | Fator | 179/81 E |
| 2,573,617 | 10/1951 | Shann | 179/81 C |
| 4,136,266 | 1/1979 | Cohen et al. | 179/81 C |

Primary Examiner—Raymond F. Cardillo, Jr.
Assistant Examiner—Joseph A. Popek
Attorney, Agent, or Firm—Kirschstein, Kirschstein, Ottinger & Cobrin

[57] ABSTRACT

A compact telephone intruder alarm system is operative for indicating to a current on-line user of a primary extension telephone which is already interconnected with the telephone line of the subsequent interconnection and disconnection of another auxiliary extension telephone with the same telephone line. Electrical OFF- and ON-hook signals are respectively generated each time an extension telephone is interconnected or disconnected with the telephone line, and each such hook signal is successively detected and electrically amplified before being conducted to a light-emitting diode. The first detected OFF-hook signal indicates the start of the interconnection of the auxiliary extension telephone, and the second detected ON-hook signal indicates the duration and the end of the intruder presence on the telephone line. All electrical components are of miniature size and are mounted within the handset to simplify and to make installation less discernible. The light-emitting diode is readily viewable during conversation because it is mounted directly on the handset and instantly conveys the intrusion to the user.

28 Claims, 4 Drawing Figures

SYSTEM FOR AND METHOD OF INDICATING INTRUDER PRESENCE ON TELEPHONE LINES, AND METHOD OF INSTALLATION OF TELEPHONE INTRUDER ALARM SYSTEM

BACKGROUND OF THE INVENTION

1. Field of the Invention

The present invention generally relates to improvements in telephone communication systems having a plurality of extension telephones adapted to be interconnected with the same telephone line and, more particularly, to a telephone intruder alarm system for and a method of indicating the subsequent interconnection and disconnection of an extension phone with a telephone line to a current on-line user. Still more particularly, the invention relates to a method of installing such systems on conventional telephone lines.

2. Description of the Prior Art

In conventional telephonic communication systems, extension telephones are adapted to be connected in parallel with each other and with a telephone line through appropriate switches located in the base of the respective telephones. That is, an extension telephone is connected with a telephone line simply by removing the receiver from the cradle so that the particular telephone goes "OFF-hook." The person using the telephone may then place his call and converse with the called party in the conventional manner. Additionally, any one of the other extension telephones may also be connected with the same telephone line by the same procedure (i.e. by removing the receiver of any one of the other extension telephones from its associated cradle). In fact, this type of system has been used extensively for conference calls in which a plurality of people are connected with the called or calling party, as the case may be.

However, this same system also provides a means for allowing unauthorized personnel to overhear private conversations. More specifically, someone desiring to eavesdrop on another party's conversation may do so by removing the receiver of any one of the unused extension telephones. Consequently, parties desiring complete telephonic privacy have been forced to use separate phone lines, rather than risk the chance of being overheard, either accidentally or otherwise, through an unused extension telephone.

In order to eliminate the possibility of such eavesdropping by unauthorized personnel, the prior art has proposed a multi-element telephone exclusion circuit arrangement which is operative to connect a selected one of a plurality of extension telephones to a telephone line and to automatically exclude all other extension telephones therefrom. Although the proposed telephone exclusion circuit arrangement is generally satisfactory for its intended purpose, it is not altogether practical, nor cost effective in practice. The complexity, high cost and maintenance problems associated with a telephone exclusion circuit which is comprised of a large number of parts, including separate wiring, makes it particularly undesirable for use in the home environment.

In U.S. Pat. No. 4,136,266, a novel highly reliable system which overcomes the drawbacks mentioned above and which alerts an on-line user to the presence of an intruder on the telephone line is set forth. Although very satisfactory for its intended purpose, it is now desirable to further refine this type of system.

SUMMARY OF THE INVENTION

1. Objects of the Invention

Accordingly, it is the general object of the present invention to overcome the above-identified drawbacks of the prior art.

A further object of the present invention is to provide a reliable, simple-to-manufacture, inexpensive telephone intruder indicator system for indicating the subsequent interconnection and disconnection of an extension telephone with a telephone line to a current on-line user.

A further object of the present invention is to provide a miniaturized, highly compact telephone intruder indicator system which is hardly discernible after installation.

A further object of the present invention is to provide a compact self-contained indicator system which is easy to install without requiring special skills, specially-trained personnel or requiring extensive tampering with existing phone wiring.

A further object of the present invention is to provide a compact self-contained indicator system having its own power source and low energy drain.

A further object of the present invention is to provide an intruder alert system of the type described which is compatible for use with existing telephone systems having a plurality of extension telephones.

A further object of this invention is to preserve the advantage of use of the interconnected phones for intercommunication, as in conference calls, when desired.

A further object of this invention is the addition of "alarms" or signaling means to the existing installation without costly modifications of installation or addition of interconnecting wiring.

A further object of this invention is to make possible the use of the signaling device in a selective manner, to switch it on when required and to shut it off when desired.

A further object of this invention is to enable the user to operate the device without interference with the normal operation of the telephone.

A further object of this invention is to provide a novel method of indicating the presence of an intruder to the on-line user.

A further object of this invention is to provide a reliable and simple method of installing intruder alert systems on existing telephone equipment.

2. Features of the Invention

In keeping with these objects and others which will become apparent hereinafter, one feature of the invention resides, briefly stated, in a compact telephone intruder alarm system for indicating the subsequent interconnection and disconnection of an extension telephone with a telephone line to a current on-line user, which comprises means for detecting electrical OFF- and ON-hook signals which are respectively generated in response to interconnection and disconnection of an auxiliary extension telephone with a telephone line, and means responsive to the detection of the electrical OFF- and ON-hook signals for indicating to a current on-line user of a primary extension telephone which is already interconnected with the telephone line of the subsequent interconnection and disconnection of the auxiliary extension telephone.

In accordance with the invention, the detecting means and the indicating means are both mounted on, and preferably within, the handset of the primary extension telephone. The installation of the compact alarm system with conventional telephones is thereby greatly simplified and, of course, the installation is hardly discernible. This latter feature overcomes prior art alarm systems which are of large size and therefore too bulky to be mounted within a telephone handset.

In further accordance with the present invention, the indicating means includes an indicator which is actuatable between an alarm state in which the indicator indicates the start of the interconnection of the auxiliary extension telephone in response to detection of the OFF-hook electrical signal, and a non-alarm state in which the indicator indicates the end of the interconnection in response to detection of the ON-hook electrical signal. As long as the OFF-hook signal is detected, the indicator remains in the alarm state.

The detecting means is operative for sensing changes in the DC voltage level of the hook signals, and these voltage level changes are employed to trigger the indicator between the aforementioned states. Inasmuch as the DC voltage level remains substantially constant during the time that the OFF-hook signal is detected, the indicator continuously remains substantially in the alarm state. Analogously, the indicator continuously remains substantially in the non-alarm state for as long as the ON-hook signal is detected, because the DC voltage level of this signal likewise remains substantially constant.

According to the above-mentioned features, the on-line user is reliably alerted to the presence of the intruder on the telephone line. The indicator, which may be of the visually or auditory-indicating type, is operative to alert the on-line user to the start, duration and the end of the interconnection of the auxiliary extension telephone into an active phone conversation.

Likewise, the small size of the electrical components and the installation of the latter all directly into the handset itself is highly desirable, not only from an aesthetic, but also from a functional point of view. During conversation, the indicator will normally be located directly in front of the user's face, thereby instantly conveying the intrusion to the user.

The novel features which are considered as characteristic for the invention are set forth in particular in the appended claims. The invention itself, however, both as to its construction and its method of operation, together with additional objects and advantages thereof, will best be understood from the following description of the specific embodiments when read in connection with the accompanying drawings.

DETAILED DESCRIPTION OF THE PREFERRED EMBODIMENTS

Figure 1:
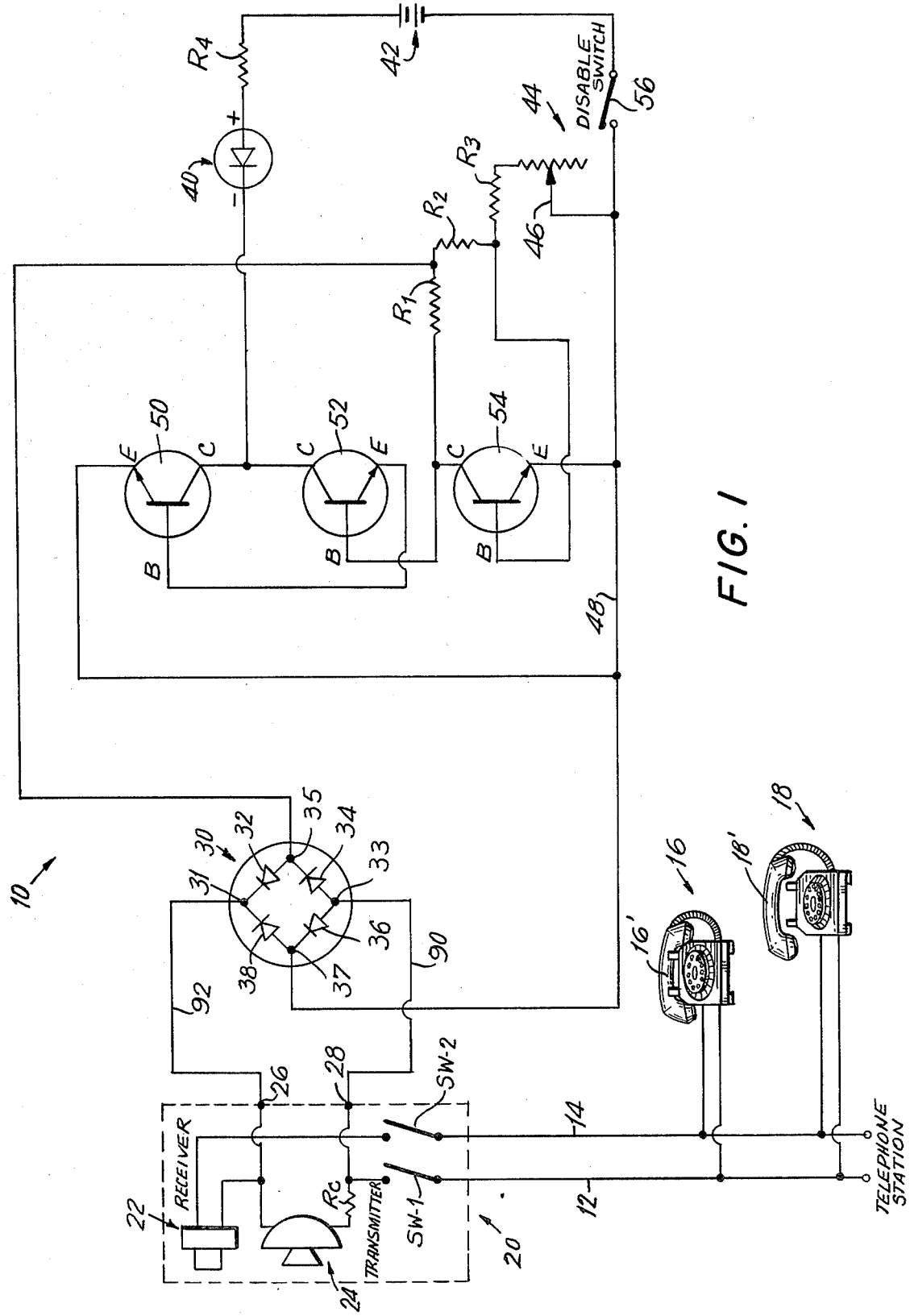
FIG. 1 is a partially schematic circuit diagram representation of a telephone intruder alarm system in accordance with the present invention.

Referring now to FIG. 1 of the drawings, reference numeral 10 generally identifies a compact telephone intruder alarm system electrical circuit arrangement in accordance with the present invention. A pair of telephone lines 12, 14 connected to a non-illustrated telephone terminal station are conducted to a plurality of extension telephones 16, 18, 20.

For purposes of illustration, the system of the present invention is described in conjunction with three extension telephones. However, it is to be noted that this is by way of illustration only and is not to be interpreted as a limitation of the invention. That is, it will be apparent that the system of the present invention may be utilized with any number of extension telephones.

Moreover, extension telephones 16, 18 are shown in pictorial form with handset receiver 16' mounted in its associated cradle (ON-hook position), and handset receiver 18' mounted off its associated cradle (OFF-hook position). Extension telephone 20 which is analogous to phones 16, 18 is shown in partially diagrammatic, partially schematic wiring circuit form. Extension telephone 20 includes a receiver 22 and a microphone transmitter 24, both generally mounted at opposite end regions of the associated receiver or handset of a conventional telephone such as the standard Bell 500 type telephone set. Such standard telephone sets have telephone switches SW-1 and SW-2 respectively connected in series with the tip (T) and the ring (R) telephone lines 12, 14.

Microphone output terminals 26, 28 are located on extension telephone 20 downstream of switches SW-1, SW-2. In conventional operation, when a call is to be completed, the telephone terminal station transmits a ringing current signal at a high voltage level of about 100 volts to the extension telephones to ring their respective bells. During this time, the switches SW-1 and SW-2 are open, thereby preventing the ringing current from being conducted to system 10 and doing damage to the same. When a user removes the handset from its cradle, the switches SW-1 and SW-2 close, but simultaneously the ringing current is cut-off and, in its place, the terminal station transmits a modulated low level electrical signal at about a 6 DC volt level along the telephone lines 12, 14. The voltage waveform varies with the amplitude of the transmitted acoustic signals. The average output voltage level at the phone output terminals 26, 28 lies between 3.5 v and 4.5 v; the typical value being about 4 v.

In accordance with the present invention, the system 10 is operative for indicating the subsequent interconnection and/or disconnection of any extension telephone with the telephone line to a current on-line user. For ease of description, it will be assumed that primary extension telephone 20 is already connected with the telephone line 12, 14 and is currently employed by an on-line user, and further that either or both auxiliary extension telephones 16, 18 are available to be subsequently used by an eavesdropper-intruder. It will be further assumed that intruder extension telephone 18 has been put in first use and, in that case, the remaining extension telephone (e.g. 16) would be available for another would-be eavesdropper.

The system's operation is based on the discovery that interconnecting or disconnecting an additional auxiliary extension telephone with a telephone line already in use by a primary extension telephone produces so-called "OFF- and ON-hook" signals having distinctive acoustic and electrical properties. More particularly, when a handset of an auxiliary extension phone is removed from its associated cradle, this "OFF-hook" action produces not only a characteristic click sound which can be heard in the receiver, but also generates a sudden drop in the electric potential being supplied on the telephone line. The voltage potential drop at the receiver has been measured at the output terminals 26, 28 to be about 0.5 volts. Furthermore, when a handset is replaced on its associated cradle, this "ON-hook" action generates a similar electrical signal, except that it is followed by a rise in the supply voltage by about the same amount, i.e. 0.5 volts.

The voltage versus time characteristic waveform of the output signal therefore ideally has a substantially constant DC voltage amplitude at about a predetermined 4 volt level before any interconnection is made by the intruder phone 18. Once the handset 18' is removed from the cradle of intruder phone 18, then the voltage amplitude rapidly drops by about 0.5 volts (1.0–2 volt max. voltage drop) and remains at this substantially constant lower magnitude level (approximately 3.5 volts) for as long as the handset 18' of the intruder phone 18 is in the OFF-hook position.

Also, assuming ideal conditions, the voltage versus time waveform characteristic of the output signal remains at the aforementioned lower magnitude level (approximately 3.5 volts) before disconnection is made. Once the handset 18' of intruder phone 18 is replaced, then the voltage amplitude rapidly increases and returns to the aforementioned predetermined 4 volt level. The voltage remains at this 4 volt level for as long as the handset of the intruder phone is in the ON-hook position.

The invention uses these phenomena to identify and to signal the start, duration and the end of interconnection of an auxiliary extension telephone into an active phone conversation. Each variation in the amplitude level of each electrical signal is detected by a detector sub-circuit, and the detected signal is employed to actuate an indicator, preferably of the visually-indicating lamp type or of the auditory-indicating buzzer type, to alert the on-line user to the presence of an intruder on the telephone line.

The detector circuit includes a full wave bridge rectifier sub-circuit 30 having input terminals 31, 33 and output terminals 35, 37 and diodes 32, 34, 36, 38, each diode being arranged between a respective input terminal and a respective output terminal. The rectifier sub-circuit 30 is operative to cut-off the negative going voltage variations in the microphone output voltage waveform.

It will be noted that the output voltage waveform at microphone output terminals 26, 28 is not a pure DC waveform, but is irregular in nature. First, there are positive going variations having peaks and valleys which are caused by the outgoing voice signals of the local on-line speaker. Second, there are both positive and negative going variations having peaks and valleys which are due to the incoming voice signals of the remote on-line listener. In the latter case, the incoming electrical speech signals are inductively coupled over to the wires connected to the local transmitter to thereby generate undesirable alternating current-type voltage variations at the microphone output terminals. Of course, there is always transient noise of an irregular nature, voltage spikes with associated ringing caused when an intruder phone goes OFF-hook, and voltage overshoots again with associated ringing caused when an intruder phone goes back ON-hook. All of the negative going variations in the above-described output voltage waveform are cut-off by the full wave bridge rectifier circuit 30. The indicator means includes a visually-indicating electrical lamp, such as a light-emitting diode or indicator 40, which is a current actuatable device energizable between a non-alarm state (indicator extinguished) and an alarm state (indicator lit) in response to passage of an electrical current of a predetermined magnitude through the indicator 40.

The current level through the indicator 40 is supplied from two sources. First, the detector circuit includes a miniature low-drain DC power source or battery 42 for supplying current to the anode side of diode 40 through current-limiting resistor $R_4$. Second, the bridge output terminals 35, 37 are connected through a voltage divider composed of resistors $R_1$, $R_2$, $R_3$, to potentiometer 44, which has a movable wiper arm 46. A portion of the rectified current which is tapped off at the junction between resistors $R_1$ and $R_2$ is fed to the base of transistor 52; and the portion of the rectified current which is tapped off at the junction between resistors $R_2$ and $R_3$ is fed to the base of transistor 54. The collector of transistor 54 is also fed to the base of transistor 52. The emitter of transistor 52 is fed to the base of transistor 50. The emitters of transistors 54 and 50 and the wiper arm 46 are all connected together to grounding wire 48 which is connected between the negative side of battery 42 and the ground output terminal 37. The collectors of transistors 50 and 52 are together connected to the cathode side of the diode 40. Disable switch 56 is connected in ground wire 48 to selectively enable or disable the detector circuitry.

Before use, the wiper arm 46 is manually preset so that the current passing through the indicator 40, with the disable switch 56 closed and with the handset of primary telephone 20 in the OFF-hook position, and with the auxiliary extension telephones in the ON-hook position, is set to a current-balanced equilibrium point. The current at this equilibrium point is supplied from both the battery 42 and rectifier sub-circuit 30. This current has a reduced magnitude which is slightly less than the aforementioned predetermined magnitude at which the indicator 40 lights up. Put another way, the wiper arm is adjusted so that the current passing through the indicator lamp 40 is just slightly insufficient to cause it to light up. An additional voltage drop across the indicator 40 will cause additional current to pass through the latter thereby causing the indicator 40 to light up.

This additional voltage drop is obtained from the rectified voltage output of the bridge sub-circuit 30. The current from the bridge sub-circuit 30 is on the order of micro-amperes but, after amplification by transistors 50, 52, 54, the current is increased to the milli-ampere level which is then sufficient to trigger the indicator 40 to the alarm state.

In the currently preferred embodiment shown in FIG. 1, resistors $R_1$, $R_2$, $R_3$, $R_4$, are 500 KΩ, 500 KΩ, 56 KΩ, 220Ω, respectively. The potentiometer 44 has an internal resistor having a range of 100 KΩ. Transistors 50, 52, 54 are NPN silicon-type transistors (2N3904). The diodes 32, 34, 36, 38 are silicon-type 1.5 amperes, 200 volts. Battery 42 is a 6 volt silver oxide battery typically used in photographic applications.

To recapitulate the operation of the alarm system, the electrical output signal experiences a sudden drop of 0.5 volts from the 4 volt predetermined DC voltage level when the handset 18' is removed from the cradle of intruder phone 18. The negative going variations of the output voltage waveform are cut-off by the bridge subcircuit 30. The rectified voltage waveform is fed to the amplifiers 50, 52, 54, and the amplified voltage drop is fed to the indicator 40 to thereby light the same. Analogously, when the handset 18' is replaced, the voltage waveform rises suddenly and actually overshoots the 4 volt level mark by about 1 volt, but eventually settles at the 4 volt level. This means that the indicator 40 will return to its pre-set balance point, be extinguished, and be ready for another cycle.

All of the diodes, resistors, transistors, the battery, the disable switch and associated wiring discussed above, as well as the indicator 40, are mounted on the primary telephone 20 to thereby simplify installation of the alarm system with conventional telephones. Preferably, the aforementioned components are mounted within the handset of the primary telephone 20 to thereby make the installation hardly discernible to the casual observer.

Figure 2:
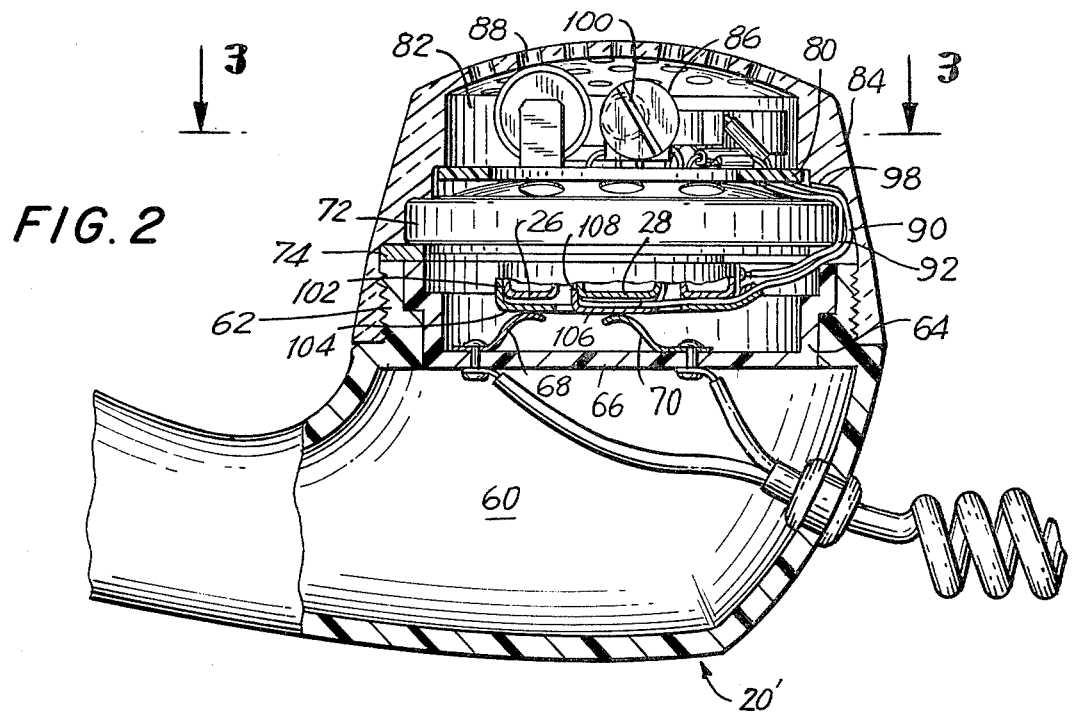
FIG. 2 is a partially sectioned side view of the alarm system of FIG. 1 as installed in a telephone handset.
Figure 3:
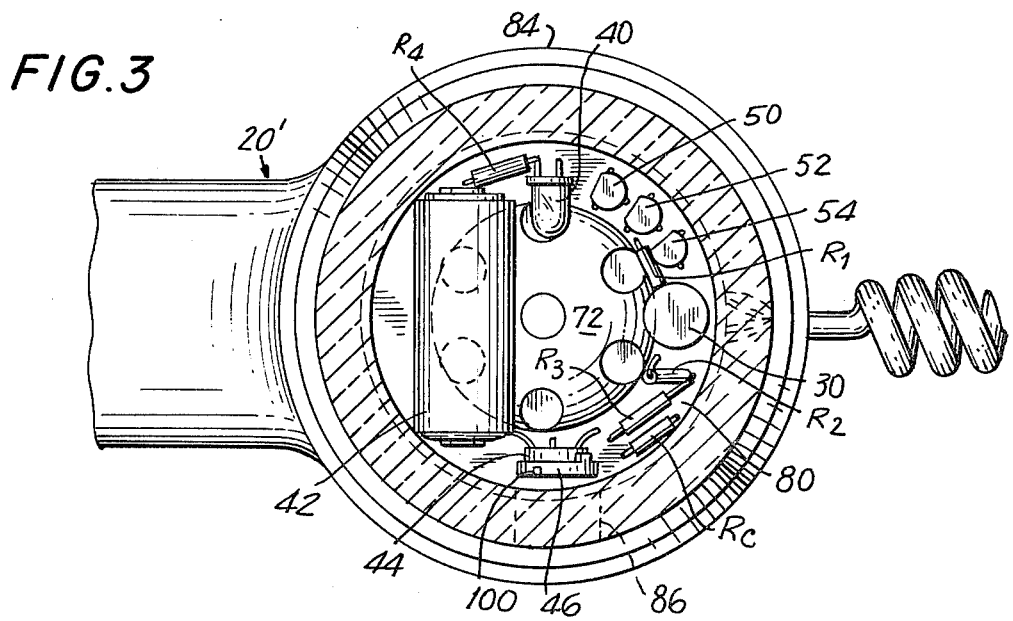
FIG. 3 is a top view of the alarm system as taken along line 3—3 of FIG. 2.
Figure 4:
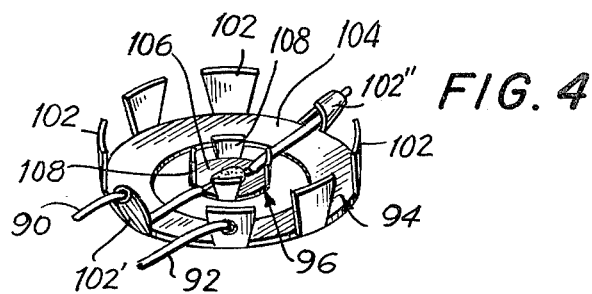
FIG. 4 is a perspective view of a detail of FIG. 2.

Referring now to FIGS. 2 and 3, the handset 20' of the primary telephone has a hollow interior 60, a threaded end region 62 at which the microphone transmitter is located, and another non-illustrated threaded end region at which the receiver is mounted. An open-ended cylindrical transmitter cup 64 has a generally circular base 66 seated within the interior 60 of end region 62, and a pair of resilient spring-type contact arms 68, 70, mounted on and extending upwardly away from the base 66. Each arm 68, 70 has one end electrically connected to the conventional red and black telephone wires, and another end which is elevated above the base 66.

A microphone transmitter 72 overlies the open end of cup 64 in juxtaposed relationship with the base 66 of the same. A circumferentially-incomplete or split washer 74 rests on the rim of cup 64, and the outer periphery of microphone 72 rests on and is thereby supported by the washer 74. Microphone 72 has an outer circular strip terminal 26 and another circular button terminal 28 on which the contact arms 68, 70 normally rest in conventional telephone constructions to make electrical contact with the microphone and, in turn, with the conventional red and black telephone wires.

A carrier plate or printed circuit board 80 is mounted above microphone 72. Plate 80 is of generally flattened donut-shaped or ring-type configuration and, as best shown in FIG. 3, the diodes, indicator, resistors, transistors, battery and potentiometer are all mounted in circumferential direction about the outer periphery of the circular plate 80. All of the plate-mounted components are mounted in an interior compartment 82 which is bounded between the receiver cover 84 and the plate 80. All of the plate-mounted components are of miniature size and the diodes and transistors are preferably of solid-state construction to thereby permit these components to be received with clearance in the compartment 82. The central section of plate 80 is open so that the latter can seat itself over the raised generally dome-shaped central portion of the microphone 72.

The receiver cover 84 has an access port 86 formed therein. The access port extends from the exterior of the cover to the interior compartment 82 and lies adjacent to the wiper arm 46 of the potentiometer 44. Thus, adjustment of the potentiometer is facilitated after the installation of the alarm system into the phone has been completed. Typically, the wiper arm has a screw slot 100 which is dimensioned to receive a turning tool such as a screwdriver blade. Alternatively, the wiper arm may extend through the access port 86 so that the wiper arm may be manually adjusted without the aid of tools.

The transmitter cover 84 also is formed with a plurality of apertures 88 on its outer surface. The apertures 88 permit the soundwaves to impinge on the microphone membrane through the open central section of the plate 80, and also permit the on-line user to view the light emitted from the indicator alarm 40 through the apertures or, alternatively, to hear the sound emitted from an auditory-type indicator. Preferably, the cover 84 is made of transparent synthetic plastic material or the like so that the light emitted from the indicator can be easily perceived through the cover itself, rather than solely through the apertures 88. It will be appreciated that the light emitted by the lamp 40 will be instantly visible to the user, because the lamp 40 is mounted at the transmitter end region of the handset and thus, the emitted light will shine directly in front of the user's face.

Electrical communication between the plate-mounted components above the microphone 72 and the microphone output terminals 26, 28 below the microphone 72, is made by a pair of electrically conductive flexible wires 90, 92, and a pair of electrical connectors 94, 96. Electrical connector 94 includes a resilient metal, substantially planar, donut-shaped circular plate 104 having a plurality of circumferentially-spaced-apart bent fingers 102 which extend substantially perpendicular to the donut-shaped plate 104 of the connector 94. The fingers 102 tightly and grippingly engage the microphone circular strip output terminal 26 when the connector 94 is snapped over the same. Electrical connector 96 includes a resilient metal, substantially planar, circular plate 106 having a plurality of bent fingers 108 which extend substantially perpendicular to the plate 106 of the connector 96. The fingers 108 are spaced circumferentially apart of each other and tightly and grippingly engage the microphone button terminal 28 when the connector 96 is snapped over the same. Resilient contact arms 68, 70 respectively physically engage connector portions 104, 106 and thereby make electrical contact with connectors 94, 96 which, in turn, respectively electrically contact the terminals 26, 28.

Electrical wire 90 has one end in electrical communication with bridge input terminal 33 (see FIG. 1), and its other end in electrical communication with output terminal 28. Electrical wire 92 has one end in electrical communication with output terminal 26, and its other end in electrical communication with bridge input terminal 31 (see FIG. 1). Both electrical wires 90, 92 pass through the opening in the split washer 74 and through a bypass groove 98 which is formed in the interior surface of cover 84 and which extends from one side of the microphone 72 to the opposite side thereof.

The wire 90 is also used to centrally position and to support mechanically the connector 96 within the open interior of connector 94. Fingers 102', 102" on opposite sides of connector 94 are folded over so as to circumferentially embrace and clamp the insulated wire 90 at two different spaced portions therealong. Another wire portion which is intermediate the two clamped wire portions is stripped of insulation in an area facing plate 106 and thereupon soldered to the latter. This construction positions the connector 96 correctly relative to the connector 94 so that both connectors, which are separate discrete elements, can be snapped simultaneously in place over the microphone output terminals.

In order to install the alarm system of the present invention on conventional telephones, the conventional transmitter cover is unthreaded from the handset, and thereupon, the conventional microphone is removed. Next, the new transmitter cover 84, the component-carrying plate 80, the microphone 72, the connectors 94, 96, with the interconnected wires 90, 92 are all mounted as a unit over the open end of cup 64. This assembled unit is screwed on the threaded end region 62 of the handset 20'. This simple replacement mounting procedure is particularly useful for consumer applications. However, to save costs, a new microphone need not be provided, but instead, the existing microphone can be used so long as the connectors 94, 96 are properly snap-fitted into place over the microphone output terminals 26, 28.

The location of the wires 90, 92 in the bypass groove 98 and the juxtaposition of the wiper arm with the screw slot 100 also serve to correctly position the plate 80 relative to the cover 84. The wires also tend to prevent the plate 80 from moving in circumferential direction relative to the cover 84 to thereby properly register access port 86 with the adjustable wiper arm 46 of the potentiometer 44, which is adjusted in the manner described above. Of course, if the wiper arm extends through the screw slot, this also serves to prevent the plate 80 from moving relative to the cover 84.

Other types of mounting arrangements within the primary telephone are, of course, possible. For example, the microphone 72 need not be located between the plate 80 and the contact arms 68, 70 but instead, the microphone 72 can be located above the plate 80.

The static output impedance of conventional carbon-type microphones is typically on the order of 600Ω when measured outside of the circuit, and the dynamic output impedance is about 40Ω when measured in operation at 1000 Hz. These impedances, however, are subject to change due, inter alia, to wear of the carbon granules over time, agglomeration of the granules, and slippage in manufacturing tolerances due to differences in the carbon lot chosen by the manufacturer.

We have found that the static output impedance can drop to as little as 150Ω in certain cases. This value lowers the output voltage at the microphone output terminals to less than 4 v and, in turn, lowers the voltage available at the lamp 40. We have found that the available range to set the lamp at its equilibrium point becomes too limited for practical purposes.

Consequently, in order to increase the output voltage and the adjustment range for the lamp, a compensating resistor $R_c$ is electrically connected in series between one of the microphone output terminals and one of the telephone lines. In FIG. 1, for example, $R_c$ is connected between output terminal 28 and telephone line 12.

We have found that a resistance between 40Ω and 100Ω is satisfactory for compensating for the impedance of most conventional carbon-type microphones. Best results have been obtained with a resistor of 68Ω±10%.

The compensating resistor is operative for compensating the in-circuit resistance of the microphone to a value sufficient to insure that an approximately 4 v output signal is present at the output terminals 26, 28.

In a preferred embodiment, the compensating resistor $R_c$ is mounted on the plate 80 along with and interconnected to the aforementioned electrical components (see FIG. 3).

It will be understood that each of the elements described above, or two or more together, may also find a useful application in other types of constructions differing from the types described above.

While the invention has been illustrated and described as embodied in a system for and method of indicating intruder presence on telephone lines, and method of installation of telephone intruder alert system, it is not intended to be limited to the details shown, since various modifications and structural changes may be made without departing in any way from the spirit of the present invention.

Without further analysis, the foregoing will so fully reveal the gist of the present invention, that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A compact telephone intruder alarm system for indicating the subsequent interconnection and disconnection of an extension telephone with a telephone line to a current on-line user, comprising:
    (a) means for detecting electrical OFF-and ON-hook signals which are respectively generated in response to interconnection and disconnection of an auxiliary extension telephone with a telephone line;
    (b) means responsive to the detection of the electrical OFF- and ON-hook signals for indicating to a current online user of a primary extension telephone which is already interconnected with the telephone line of the subsequent interconnection and disconnection of the auxiliary extension telephone, to thereby alert the on-line user to the presence of an intruder on the telephone line;
    (c) means for mounting both said detecting means and said indicating means on the primary extension telephone, to thereby simplify installation of the compact telephone intruder alarm system with conventional telephones;
    (d) said primary extension telephone including a microphone transmitter and a handset having an interior; and
    (e) said mounting means being operative for mounting both said detecting means and said indicating means within the interior of the handset to thereby make the installation of the compact alarm system with conventional telephones hardly discernible, said mounting means including a carrier plate on which both said detecting means and said indicating means are mounted, and a transmitter cover mounted on the handset in overlying relationship with the microphone transmitter and said carrier plate.

2. The compact alarm system as defined in claim 1, wherein said transmitter cover bounds an interior compartment with said handset, and wherein said detecting means includes a plurality of solid-state components all being of a miniature size and being received with clearance in said interior compartment.

3. The compact alarm system as defined in claim 2, wherein said transmitter cover has an access port which extends from the exterior of said cover to said interior compartment, and wherein said detecting means further includes an adjustable potentiometer within said interior compartment and having a movable wiper arm which is accessible through said access port.

4. The compact alarm system as defined in claim 2, wherein said transmitter cover has a plurality of apertures each extending from said interior compartment to the exterior of said cover, and wherein said indicating means is a visually-indicating electrical lamp located adjacent the apertures within said interior compartment to thereby permit viewing of the light emitted from the lamp through the apertures.

5. The compact alarm system as defined in claim 4, wherein said transmitter cover is constituted by transparent material to thereby permit viewing of the light emitted from the lamp through the transparent material of said cover.

6. The compact alarm system as defined in claim 2, wherein said detecting means further includes a miniature, low-drain DC power source operative for energizing said solid-state components and being located within said interior compartment.

7. The compact alarm system as defined in claim 1, wherein the primary extension telephone further includes an open-ended transmitter cup having a base mounted within the interior of the handset, and a pair of resilient contact arms electrically connected to the telephone line and extending from the base generally upwardly towards the open end of the transmitter cup; and wherein said microphone transmitter overlies the open end of the transmitter cup in juxtaposed relationship with the base of the same; and wherein said mounting means includes a pair of electrical connectors each electrically connected to a different respective terminal of the microphone transmitter and to a different respective resilient contact arm.

8. The compact alarm system as defined in claim 7, wherein said microphone transmitter is mounted intermediate said carrier plate and said resilient contact arms; and wherein said mounting means includes a pair of electrically conductive wires each having one end electrically connected to a different one of said connectors at one side of said microphone transmitter, and another end electrically connected to said detecting means at the other side of said microphone transmitter.

9. The compact alarm system as defined in claim 8, wherein each connector includes a substantially planar, generally circular base portion, and a plurality of bent fingers spaced circumferentially about and extending generally normally of the respective base portion.

10. The compact alarm system as defined in claim 9, wherein one of said wires has a pair of different wire portions spaced lengthwise of each other, and an intermediate wire portion being located between said different wire portions and being electrically connected to one of said connectors; and wherein the other of said connectors has a pair of clamping fingers circumferentially folded over said different wire portions to clamp the latter and to thereby mechanically support said one connector relative to said other connector.

11. The compact alarm system as defined in claim 7, wherein said transmitter cover is formed with a bypass groove which extends from said one to said other side of said microphone transmitter, said bypass groove being dimensioned to accommodate said electrically conductive wires.

12. A compact telephone intruder alarm system for indicating the subsequent interconnection and disconnection of an extension telephone with a telephone line to a current on-line user, comprising:
(a) means for detecting electrical OFF- and ON-hook signals which are respectively generated in response to interconnection and disconnection of an auxiliary extension telephone with a telephone line, said detecting means including a rectifier sub-circuit for rectifying the electrical hook signals to thereby substantially eliminate undesirable voltage variations on the electrical hook signals;
(b) means responsive to the detection of the electrical OFF- and ON-hook signals for indicating to a current on-line user of a primary extension telephone which is already interconnected with the telephone line of the subsequent interconnection and disconnection of the auxiliary extension telephone, to thereby alert the on-line user to the presence of an intruder on the telephone line; and
(c) means for mounting both said detecting means and said indicating means on the primary extension telephone, to thereby simplify installation of the compact telephone intruder alarm system with conventional telephones.

13. The compact alarm system as defined in claim 12, wherein said rectifier circuit is a full wave bridge rectifier circuit for cutting off the negative voltage variations of the electrical hook signals.

14. The compact alarm system as defined in claim 12, wherein said detecting means further includes an amplifier subcircuit for amplifying the rectified hook signals.

15. A compact telephone intruder alarm system for indicating the subsequent interconnection and disconnection of an extension telephone with a telephone line to a current on-line user, comprising:
(a) means for detecting electrical OFF- and ON-hook signals which are respectively generated in response to interconnection and disconnection of an auxiliary extension telephone with a telephone line;
(b) means responsive to the detection of the electrical OFF- and ON-hook signals for indicating to a current on-line user of a primary extension telephone which is already interconnected with the telephone line of the subsequent interconnection and disconnection of the auxiliary extension telephone, to thereby alert the on-line user to the presence of an intruder on the telephone line;
(c) means for mounting both said detecting means and said indicating means on the primary extension telephone, to thereby simplify installation of the compact telephone intruder alarm system with conventional telephones;
(d) said electrical OFF-hook signal having a voltage versus time characteristic whose amplitude drops from a predetermined DC voltage level before said interconnection is made, to a lower DC voltage level after, and for as long as, such interconnection; said electrical ON-hook signal having a voltage versus time characteristic whose amplitude rises from the lower DC voltage level before said disconnection is made, to the predetermined DC voltage level after such disconnection; said detecting means being operative for sensing the changes in voltage level of said signals; said indicating means being operative for continuously indicating the presence of the intruder on the telephone line all during the time that the lower DC voltage level is present on the telephone line; and
(e) said indicating means including a current-actuatable indicator which is actuatable from a non-alarm state to an alarm state in response to passage of an electrical current of a predetermined magnitude through the indicator; said detecting means including a power source for generating current, pre-set means electrically connected to both the power source and the telephone line for adjustably setting the current passing through the indicator to a current-balanced equilibrium position at which electrical current from both the power source and the telephone line has a reduced magnitude which is slightly less than said predetermined magnitude, and means for amplifying the detected electrical OFF-hook signal from said reduced magnitude to a magnitude which is at least equal to said predetermined magnitude to thereby indicate the start of the interconnection of the auxiliary extension telephone.

16. The compact alarm system as defined in claim 15, wherein said pre-set means is a potentiometer having a movable wiper arm operative for controlling the flow of current through the indicator.

17. The compact alarm system as defined in claim 16, wherein said indicator is a visually-indicating electrical lamp which is extinguished in the non-alarm state and lit in the alarm state.

18. The compact alarm system as defined in claim 17, wherein said lamp is a light-emitting diode.

19. A method of installing on a conventional telephone network a compact telephone intruder alarm system of the type including:
  (A) means for detecting electrical OFF- and ON-hook signals which are respectively generated in response to interconnection and disconnection of an auxiliary extension telephone with a telephone line; and
  (B) means responsive to the detection of the electrical OFF- and ON-hook signals for indicating to a current on-line user of a primary extension telephone which is already interconnected with the telephone line of the subsequent interconnection and disconnection of the auxiliary extension telephone, to thereby alert the on-line user to the presence of an intruder on the telephone line;
said method of installation comprising the steps of:
  (a) mounting the detecting means on the primary extension telephone;
  (b) mounting the indicating means on the primary extension telephone;
  (c) both of said mounting steps being performed by mounting the detecting means and the indicating means within the interior of the handset of the primary extension telephone to thereby make the installation of the compact alarm system with conventional telephones hardly discernible; and
  (d) both of said mounting steps being simultaneously performed by first removing the conventional receiver cover from the handset, and thereupon replacing the conventional cover with a modified receiver cover in which both the detecting means and the indicating means are mounted.

20. A compact telephone intruder alarm system for indicating the subsequent interconnection and disconnection of an extension telephone with a telephone line to a current on-line user, comprising:
  (a) multi-component means for detecting electrical OFF- and ON-hook signals which are respectively generated in response to interconnection and disconnection of an auxiliary extension telephone with a telephone line;
  (b) multi-component means responsive to the detection of the electrical OFF- and ON-hook signals for indicating to a current on-line user of a primary extension telephone which is already interconnected with the telephone line of the subsequent interconnection and disconnection of the auxiliary extension telephone, to thereby alert the on-line user to the presence of an intruder on the telephone line;
  (c) a transmitter cover mounted on the handset of the primary extension telephone and bounding an interior transmitter compartment therewith in which a microphone transmitter is mounted;
  (d) all of the components of said multi-component detecting means and said multi-component indicating means being of a miniature size sufficient to be received with clearance in the interior transmitter compartment; and
  (e) means for mounting all of the miniature components of said detecting means and said indicating means within the interior transmitter compartment of the handset of the primary extension telephone, to thereby make the installation of the compact telephone intruder alarm system with conventional telephones hardly discernible.

21. The compact alarm system as defined in claim 20, wherein said electrical OFF-hook signal has a voltage versus time characteristic whose amplitude drops from a predetermined DC voltage level before said interconnection is made, to a lower DC voltage level after, and for as long as, such interconnection; and wherein said electrical ON-hook signal has a voltage versus time characteristic whose amplitude rises from the lower DC voltage level before said disconnection is made, to the predetermined DC voltage level after such disconnection; and wherein said detecting means is operative for sensing the changes in voltage level of said signals; and wherein said indicating means is operative for continuously indicating the presence of the intruder on the telephone line all during the time that the lower DC voltage level is present on the telephone line.

22. The compact alarm system as defined in claim 20; and further comprising switching means in the primary extension telephone for selectively disabling said detecting means.

23. The compact alarm system as defined in claim 20, wherein the primary extension telephone includes a microphone transmitter whose static output impedance varies from one telephone to the next; and further comprising means for compensating for the variable in-circuit resistance of different microphones to insure that the output voltage of each microphone is at least equal to a predetermined level.

24. The compact alarm system as defined in claim 23, wherein the microphone transmitter is of the carbon granule type, and wherein said compensating means comprises a compensating resistor electrically connected in series with the transmitter.

25. A method of indicating the subsequent interconnection and disconnection of an extension telephone with a telephone line to a current on-line user, comprising the steps of:
  (a) providing a current-actuatable indicator which is actuatable from a non-alarm state to an alarm state in response to passage of an electrical current of a predetermined magnitude through the indicator;
  (b) supplying current to the indicator;
  (c) adjustably pre-setting the current passing through the indicator to a current-balanced equilibrium condition in which the current passing through the indicator has a reduced magnitude which is slightly less than said predetermined magnitude;

(d) detecting electrical OFF- and ON-hook signals which are respectively generated in response to interconnection and disconnection of an auxiliary extension telephone with a telephone line;

(e) amplifying the detected electrical OFF-hook signal from said reduced magnitude to a magnitude which is at least equal to said predetermined magnitude; and (f) indicating in response to the detection of the amplified electrical OFF-hook signal and to the respective detection of the electrical ON-hook signal to a current on-line user of a primary extension telephone which is already interconnected with the telephone line of the subsequent interconnection and of the respective disconnection of the auxiliary extension telephone, to thereby alert the on-line user to the presence of an intruder on the telephone line.

26. The method as defined in claim 25, wherein said electrical OFF-hook signal has a voltage versus time characteristic whose amplitude drops from a predetermined DC voltage level before said interconnection is made, to a lower DC voltage level after and for as long as such interconnection; and wherein said electrical ON-hook signal has a voltage versus time characteristic whose amplitude rises from the lower DC voltage level before said disconnection is made, to the predetermined DC voltage level after such disconnection; and wherein said detecting step includes the step of sensing the changes in voltage level of said signals; and wherein said indicating step includes the step of continuously indicating the presence of the intruder on the telephone line all during the time that the lower DC voltage level is present on the telephone line.

27. A method of installing on a conventional telephone network a compact telephone intruder alarm system of the type including:

(A) multi-component means for detetecting electrical OFF- and ON-hook signals which are respectively generated in response to interconnection and disconnection of an auxiliary extension telephone with a telephone line;

(B) multi-component means responsive to the detection of the electrical OFF- and ON-hook signals for indicating to a current on-line user of a primary extension telephone which is already interconnected with the telephone line of the subsequent interconnection and disconnection of the auxiliary extension telephone, to thereby alert the on-line user to the presence of an intruder on the telephone line; and (C) all of the components of said multi-component detecting means and said multi-component indicating means being of a miniature size sufficient to be received with clearance in the interior transmitter compartment of the handset of the primary extension telephone;

said method of installation comprising the steps of:

(a) mounting the miniature components of the detecting means within the interior transmitter compartment of the handset of the primary extension telephone; and (b) mounting the miniature components of the indicating means within the interior transmitter compartment of the handset of the primary extension telephone, whereby installation of the compact telephone intruder alarm system with conventional telephones is simplified and made hardly discernible.

28. The method as defined in claim 27; and wherein one of the components of said indicating means is a current-actuatable indicator, and wherein another of the components of said indicating means is adjustable for continuously adjusting the current passing through the indicator; and further comprising the step of pre-adjusting said adjustable component when the handset of the extension telephone is in the ON-hook condition such that the current passing through the indicator is insufficient to actuate the indicator until the handset of the extension telephone is moved to the OFF-hook condition.

* * * * *